No. 660,497.  
A. R. FISCHER.  
SPRING PROPELLED VEHICLE.  
(Application filed Feb. 10, 1900.)  
Patented Oct. 23, 1900.

(No Model.) 2 Sheets—Sheet 1.

Witnesses:  
E. A. Knight  
G. S. Noble

Inventor,  
Alexander R. Fischer  
By Chas. C. Tillman  
Att'y.

No. 660,497. Patented Oct. 23, 1900.
A. R. FISCHER.
SPRING PROPELLED VEHICLE.
(Application filed Feb. 10, 1900.)
(No Model.) 2 Sheets—Sheet 2.
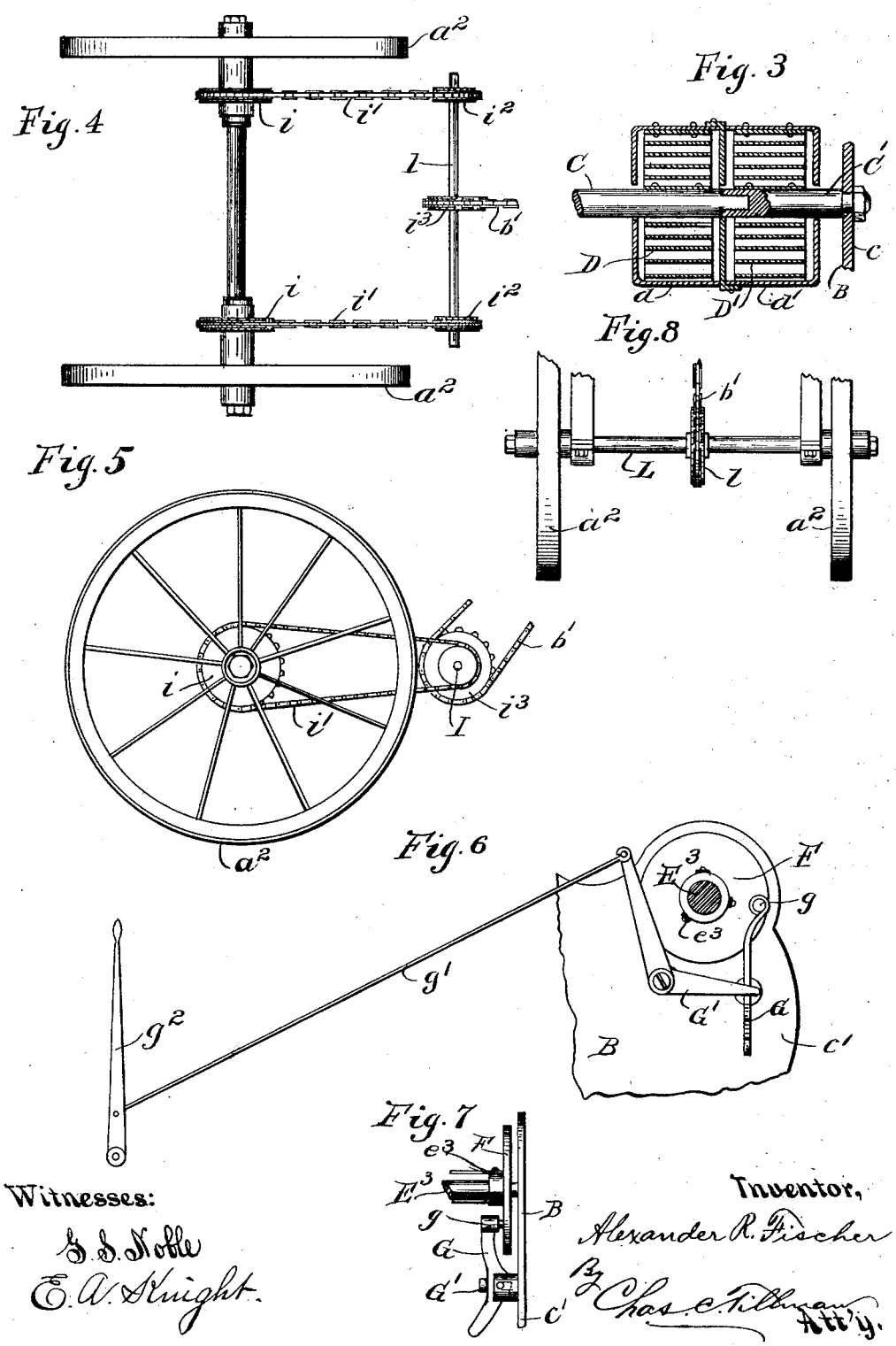
Witnesses:
G. S. Noble
E. A. Knight
Inventor,
Alexander R. Fischer
By Chas. C. Tillman
Att'y

UNITED STATES PATENT OFFICE.

ALEXANDER R. FISCHER, OF CHICAGO, ILLINOIS, ASSIGNOR OF ONE-HALF TO SARAH AGNES McDONALD, OF SAME PLACE.

SPRING-PROPELLED VEHICLE.

SPECIFICATION forming part of Letters Patent No. 660,497, dated October 23, 1900.

Application filed February 10, 1900. Serial No. 4,751. (No model.)

*To all whom it may concern:*

Be it known that I, ALEXANDER R. FISCHER, a citizen of the United States, residing at Chicago, in the county of Cook and State of Illinois, have invented certain new and useful Improvements in Spring-Propelled Vehicles, of which the following is a specification.

This invention relates to improvements in the means of propelling vehicles; and it consists in certain peculiarities of the construction, novel arrangement, and operation of the various parts thereof, as will be hereinafter more fully set forth, and specifically claimed.

The principal object of my invention is to provide a motor for propelling vehicles or for furnishing power for other purposes which shall be simple and inexpensive in construction, strong, durable, and effective in operation.

Another object of my invention is to provide a means for controlling the motor, so as to regulate the speed of the vehicle or other apparatus driven thereby.

Other objects and advantages will be disclosed in the subjoined description and statement of the operation of the device.

In order to enable others skilled in the art to which my invention pertains to make and use the same, I will now proceed to describe it, referring to the accompanying drawings, in which—

Figure 1:
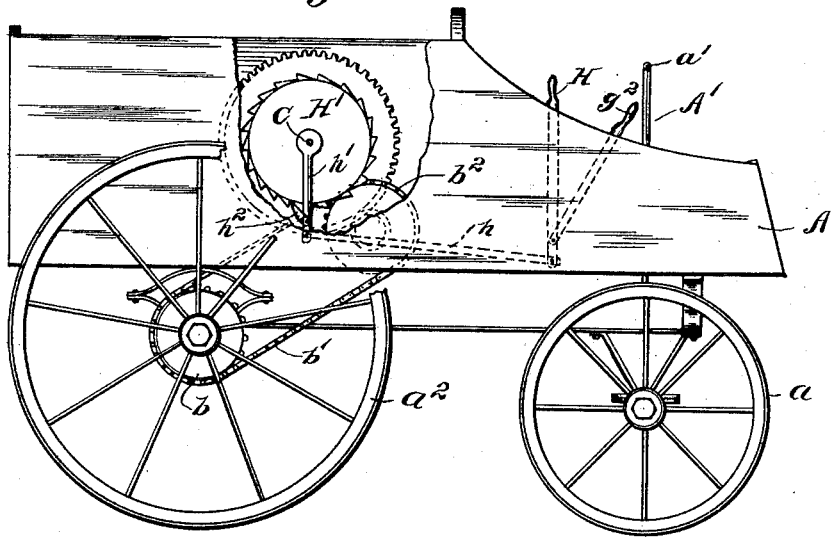
Figure 2:
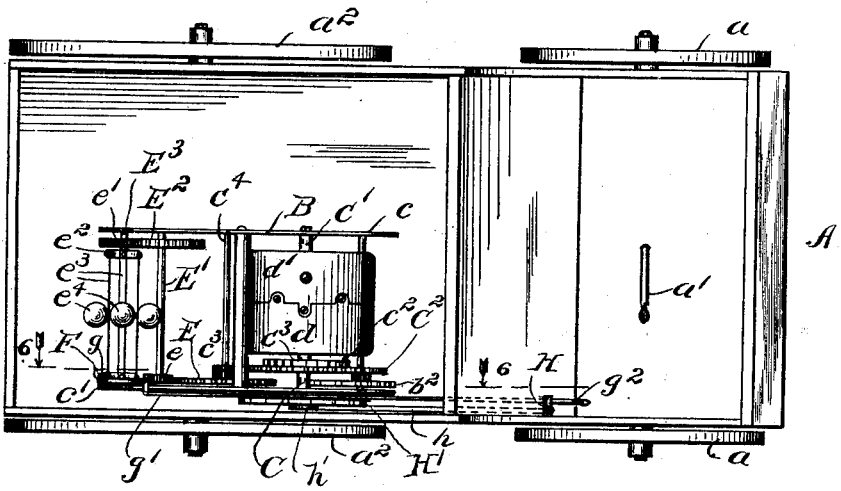

Figure 1 is a view in side elevation of a vehicle embodying my invention, showing a portion of the bed or body broken away to illustrate the position of the motor. Fig. 2 is a plan view thereof. Fig. 3 is a plan sectional view of the motor-springs and a portion of the driving-shaft. Fig. 4 is a plan view of the rear portion of the vehicle, showing a modification in the manner of gearing the motor to the vehicle-wheels. Fig. 5 is a view in side elevation thereof. Fig. 6 is a detail view, in side elevation, partly in section, taken on line 6 6 of Fig. 2 of the clutch mechanism for controlling the motor. Fig. 7 is a view in end elevation thereof; and Fig. 8 is a view in elevation, partly in section, of the rear axle of a vehicle, showing a modification in the means of gearing it to the motor.

Similar letters refer to like parts throughout the different views of the drawings.

A represents a vehicle, which may be of the ordinary or any preferred construction; but in the present instance I have shown it as having four wheels, the front wheels $a$ of which may be steered by means of the steering-post $A'$, having at its upper end a crank or handle $a'$, the lower end of said post being fixed to the axle of the front wheels. On the inner portion of the hub of one of the rear wheels $a^2$ is fixed a sprocket-wheel $b$, around which passes a sprocket-chain $b'$, which also passes over and engages a sprocket-wheel $b^2$, mounted on a shaft transversely journaled on the frame B of the motor, which frame comprises two pieces $c$ and $c'$, between which are mounted on suitable shafts the various parts of the motor. Journaled in the frame B is a driving-shaft C, whose inner end is socketed in the inner end of the stub-shaft $C'$, journaled in the frame B of the motor. Fixed at one of its ends to the driving-shaft C is a spring D, whose other end is fixed to the casing which surrounds said spring and which casing comprises two sections $d$ and $d'$, which are secured together at their meeting edges. Fixed to the stub-shaft $C'$ at one of its ends is another spring $D'$, which convolves in the opposite direction from the convolutions of the spring D and has its other end fixed to the section $d'$ of the casing, which casing is loosely mounted on the shafts C and $C'$, so as to allow the driving-shaft to be rotated independently thereof. By thus mounting the springs D and $D'$ on independently-rotatable sections of the main shaft it is apparent that when one spring has exerted itself the other spring will then act on the driving-shaft, thus economizing in space required for the spring and enabling the motor to operate a longer time than if one spring was used. Mounted on the driving-shaft C is a gear-wheel $C^2$, which carries on its inner surface a pawl $c^2$ to engage the ratchet $C^3$, also mounted on the driving-shaft, said pawl and ratchet being employed when winding the springs and to prevent their unwinding too rapidly. The gear $C^2$ meshes with a pinion on the driving-shaft of the sprocket-wheel $b^2$ and also meshes with a pinion $c^3$ on the shaft $C^4$, which is transversely journaled on the frame B and carries a gear E, which meshes with a pinion $e$ on one end of the shaft $E'$, which is journaled in the motor-frame and has mounted on its other end a gear $E^2$, which meshes with a pinion $e'$ on one end of the governor-shaft $E^3$, which is journaled on the motor-frame, on the opposite end of which is movably mounted a friction-disk F. Fixed to the shaft $E^3$, near the pinion $e'$ thereon, is a collar $e^2$, to which are secured the ends of a number of springs $e^3$, whose other ends are secured to the hub of the friction-disk and each of which is provided at about its middle with a weight $e^4$. (See Fig. 2 of the drawings.)

Fulcrumed to the piece $c'$ of the motor-frame B is a lever G, which has at its upper end a projection $g$ to contact with the face of the friction-disk F, and which lever is manipulated by means of a bell-crank lever $G'$, which is also fulcrumed on the motor-frame and has connected to its upper end a rod or bar $g'$, whose other end is connected to a lever $g^2$, fulcrumed on the front portion of the vehicle.

As shown in Figs. 6 and 7 of the drawings, the lower portion of the bell-crank lever $G'$ normally intersects the lever G about its middle, so that when the lever $g^2$ is retracted the lower portion of the bell-crank lever will be forced downwardly and in contact with the upturned or lower portion of the lever G, thus withdrawing the projection $g$ from the disk F and allowing it to move toward the collar $e^2$ on the governor-shaft. The pieces or springs $e^3$, being flexible, will be bent at their middle portions by reason of the centrifugal force of the weights which they carry.

Fulcrumed on the front portion of the vehicle-frame is a lever H, to the lower portion of which is pivotally secured a rod or bar $h$, whose other end is secured to a crank $h'$ on the driving-shaft C, which crank is provided with a pawl $h^2$ to engage a ratchet $H'$ on the driving-shaft, and which lever, crank, pawl, and ratchet are employed for winding the springs.

In Figs. 4 and 5 of the drawings I have shown a modification in the means for gearing the wheels $a^2$ of the vehicle to the motor, which consists in providing the inner portion of the hub of each wheel with a sprocket-wheel $i$, over which passes a sprocket-chain $i'$, which also passes over sprocket-wheels $i^2$, mounted on a counter-shaft I, suitably journaled on the vehicle-frame. In the middle of the counter-shaft I is a sprocket-wheel $i^3$, over which the sprocket-chain $b'$ passes to the sprocket-wheel $b^2$ of the motor.

In Fig. 8 of the drawings is shown still another modification in the manner of gearing the rear wheels of the vehicle to the motor, which consists in rotatably journaling the rear axle L of the vehicle on the vehicle-frame and fixing the wheels on the ends of said axle. In this construction the axle is provided at its middle with a sprocket-wheel $l$, over which the sprocket-chain $b'$, leading to the sprocket-wheel $b^2$ of the motor, passes.

From the foregoing and by reference to the drawings it will be seen and clearly understood that by moving the lever H back and forth the springs D and D' will be wound on their respective shafts, when by retracting the lever $g^2$ the bell-crank lever G' will be forced down on the lever G, thus releasing the upper end of the last-named lever from the friction-clutch F, which will allow the springs to exert themselves and through their gearing with the wheels drive the vehicle, to regulate the speed of which the lever $g^2$ may be moved forward, so as to release the bell-crank lever G' from the lower portion of the lever G or so as to cause the upper portion of said lever to contact with the friction-disk, thus retarding the movement of the different parts of the motor.

When the motor is in operation, the disk F will be drawn on the shaft $E^3$ toward the collar $e^2$ by reason of the centrifugal force of the weights $e^4$ on the flexible pieces $e^3$, which unite said disk and collar.

While I have shown my motor applied to a vehicle, yet it is apparent that it may be employed for transmitting power to a shaft for driving machinery of suitable kinds.

Having thus fully described my invention, what I claim as new, and desire to secure by Letters Patent, is—

1. The combination with a motor-frame, of a driving-shaft journaled thereon, said shaft being formed of two pieces, one of which is rotatable independent of the other, a casing mounted on the driving-shaft, a spring secured at one of its ends to the rotatable piece of the shaft and at its other end to the casing, another spring secured at one of its ends to the other piece of said shaft and at its other end to the casing, a governor-shaft journaled on the frame and geared to the driving-shaft, a friction-disk movably mounted on the governor-shaft, flexible pieces provided with weights secured at one of their ends to the said disk and connected at their other ends to the governor-shaft, a lever fulcrumed to the motor-frame and having one of its ends near the disk, a bell-crank lever fulcrumed on the motor-frame and having one of its arms in contact with the first-named lever, a hand-lever suitably fulcrumed and having connection with the bell-crank lever, substantially as described.

2. The combination with a governor-shaft suitably journaled, of a friction-disk movably mounted on said shaft, a number of flexible pieces secured at one of their ends to the said disk and connected at their other ends to the governor-shaft and each carrying a weight about its middle, a lever fulcrumed near the said disk and having one of its ends adapted to be brought in contact therewith, a bell-crank lever fulcrumed near the first-named lever and having one of its ends in contact therewith and means to operate the bell-crank lever, substantially as described.

ALEXANDER R. FISCHER.

Witnesses:
CHAS. C. TILLMAN,
A. E. LYTLE.